United States Patent [19]
Brown

[11] 4,400,731
[45] Aug. 23, 1983

[54] TESTING DISPLAY SYSTEMS

[75] Inventor: Richard Brown, Shipton Oliffe, England

[73] Assignee: Smiths Industries Public Limited Company, London, England

[21] Appl. No.: 239,932

[22] Filed: Mar. 3, 1981

[30] Foreign Application Priority Data

Mar. 6, 1980 [GB] United Kingdom ............... 8007717

[51] Int. Cl.³ ........................................... H04N 7/18
[52] U.S. Cl. ................................. 358/139; 358/93; 358/107; 358/250
[58] Field of Search ............... 358/139, 93, 106, 107, 358/250; 364/515

[56] References Cited

U.S. PATENT DOCUMENTS

| | | | |
|---|---|---|---|
| 3,444,380 | 5/1969 | Webb | 358/125 |
| 3,614,240 | 10/1971 | Brandts | 358/125 |
| 3,632,865 | 1/1972 | Haskell | 358/136 |
| 3,666,887 | 5/1972 | Freeman | 358/93 |
| 3,685,012 | 8/1972 | Case | 358/107 |
| 3,836,259 | 9/1974 | Partridge | 358/125 |
| 3,890,462 | 6/1975 | Limb | 358/105 |
| 3,890,463 | 6/1975 | Ikegami | 358/93 |
| 3,915,548 | 10/1975 | Opittek | 358/93 |
| 4,001,499 | 1/1977 | Dowell | 358/93 |
| 4,214,265 | 7/1980 | Olesen | 358/93 |

FOREIGN PATENT DOCUMENTS

| | | | |
|---|---|---|---|
| 53-117928 | 10/1978 | Japan | 358/139 |
| 55-11663 | 1/1980 | Japan | 358/139 |
| 55-138976 | 10/1980 | Japan | 358/139 |

*Primary Examiner*—Howard Britton
*Attorney, Agent, or Firm*—Pollock, Vande Sande & Priddy

[57] ABSTRACT

Head-up display units and other display systems are tested by means of a camera having an array of light-responsive elements. The signals supplied to the display system to control the disposition of the display representation in the display area of the system, are compared with the output from the camera so as to derive an indication of the difference between the signalled disposition and the actual disposition of the representation. The display unit is mounted for angular displacement about two axes at right angles to the line-of-sight. The width of the display representation is determined by measuring the distance between two points of the same brightness on opposite sides of the center of the representation; this is done by displacing the image formed on the array across an individual element of the array. The brightness of the display representation is determined by comparison with a source that is switchable between two known brightness levels.

9 Claims, 4 Drawing Figures

TESTING DISPLAY SYSTEMS

BACKGROUND OF THE INVENTION

This invention relates to apparatus and methods of testing display systems.

The invention is more especially, but not exclusively, concerned with apparatus and methods of testing systems which include cathode-ray tube displays such as for example, some aircraft head-up display systems.

To ensure accuracy in reading a display system it is necessary to calibrate or adjust it by observing its response to signals of known value. This is done, for example, with a pointer instrument, by supplying a known voltage across the instrument and having an observer note the deflection of the pointer. The observer determines the error in the deflection and calculates the adjustment that is required to be made to the instrument to correct for this error. In a cathode-ray tube display system arranged to display a line symbol, it may be necessary to determine the size of the symbol, the line width, the orientation of the line and its location, and the brightness of the symbol. In, for example, a head-up display system where the image on a cathode-ray tube is focussed at infinity, it is necessary to determine the disposition of the image in terms of angles subtended at the observer. At present this is done by rigidly mounting the display unit and by measuring angles with a theodolite that is rotated to align with the image. The orientation of the theodolite is noted by the observer and calculations made to determine any adjustments that may be needed to be made to the unit.

As can be appreciated, these manual methods of testing are lengthy and tiresome especially in the case of head-up display systems.

BRIEF SUMMMARY OF THE INVENTION

It is an object of the present invention to provide apparatus and methods of testing that can be used to alleviate the above-mentioned disadvantages.

According to one aspect of the present invention there is provided apparatus for determining the disposition of a display representation in a display area of a display system, the apparatus including a camera of the kind having an array of radiation-responsive elements, said camera being arranged to view said display area and to derive an indication of the disposition of said representation; means for supplying signals to said display system such as to affect the disposition of said display representation; and means for comparing the disposition of said display representation as derived from said camera with said signals to said display system such as thereby to derive an indication of the difference between the signalled disposition and the actual disposition of said display representation.

According to another aspect of the present invention there is provided a method of determining the disposition of a display representation in a display area of a display system including the steps of supplying to the system signals affecting the disposition of said display representation, viewing the display area with a camera of the kind including an array of radiation-responsive elements, deriving an indication of the disposition of said display representation from the camera, and comparing the disposition of said display representation as derived by the camera with said signals supplied to the display system so as thereby to derive an indication of the difference between the signalled disposition and the actual disposition of the display representation.

The display area may be the screen of a cathode-ray tube. The display system may be arranged to provide an image of said display representation substantially at infinity and, in this respect, the display system may be a head-up display system. The display system may be mounted for rotation about one or two axes at right angles to the line-of-sight of said display system.

The apparatus may be arranged to provide an indication of a dimension of said display representation and, in this respect, the apparatus may be arranged to effect displacement of said display representation relative to the camera, across the dimension, so that an image of the display representation formed on said array thereby traverses an individual element of the array, the apparatus being arranged to determine the displacement required to effect change in the level of illumination of said element between a first predetermined level, caused by a first region of said display representation to one side of its center, and a second predetermined level equal to the first predetermined level and caused by a region of the display representation to the other side of the center, so that an indication of said dimension is thereby provided in accordance with said displacement. The first and second predetermined levels of illumination may be predetermined proportions of the extreme illumination caused by a region of said display representation towards its center.

The apparatus may include a radiation source of known brightness, and radiation directing means arranged to direct radiation from said source onto an individual element of said array, said apparatus being arranged to direct radiation from said display representation onto said individual element for comparison with said known brightness.

Various other aspects of the present invention will become apparent from the following description.

A method and apparatus for testing an aircraft head-up display system will now be described, by way of example, with reference to the accompanying drawings:

DETAILED DESCRIPTION

Figure 1:
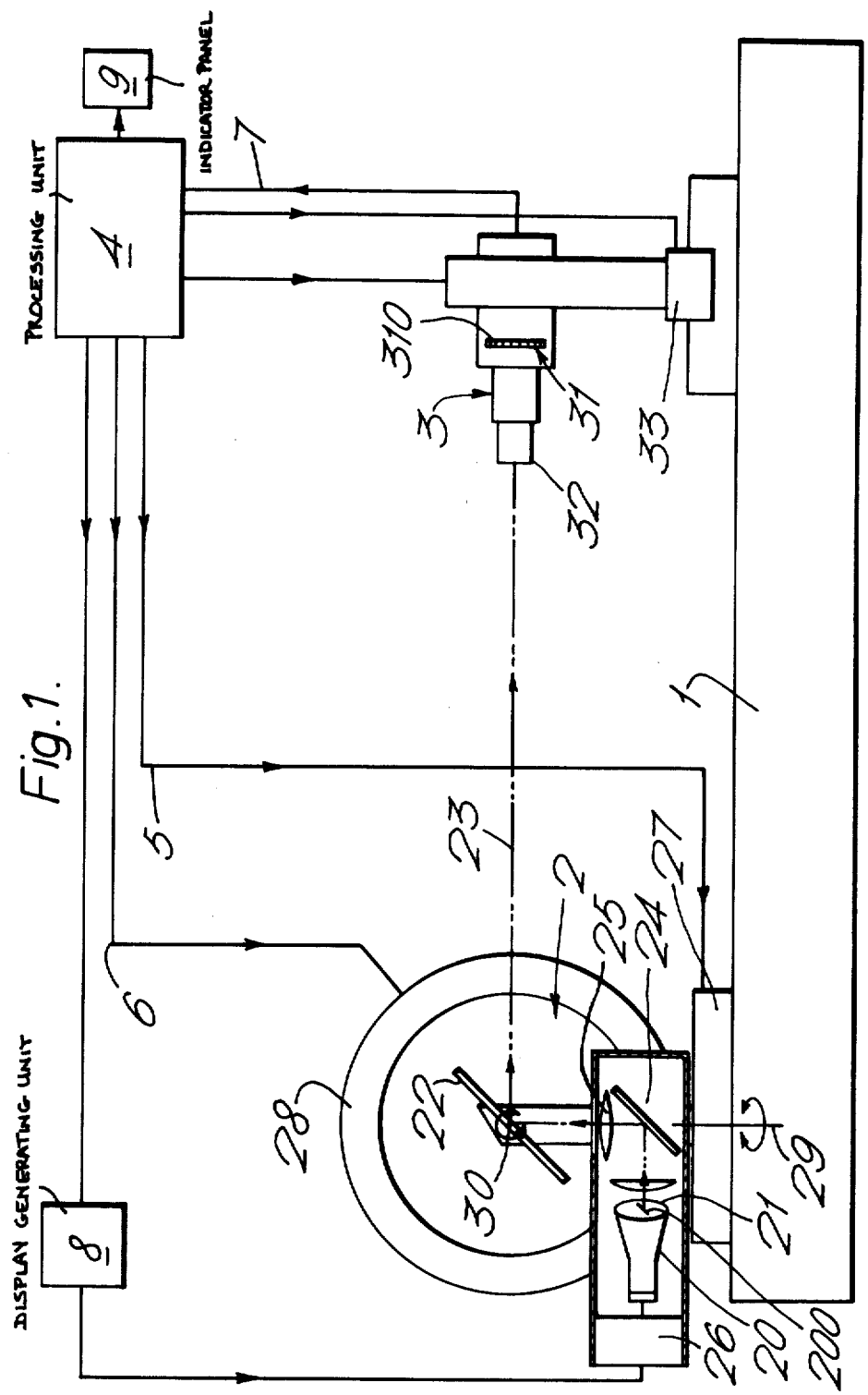
FIG. 1 shows schematically the display system and the testing apparatus.

With reference to FIG. 1, the apparatus includes an optical bench 1 on which are mounted an aircraft head-up display unit 2 and a television camera 3. Output signals from the camera 3 are supplied to a processing unit indicated generally as 4.

The optical bench 1 is of the well-known kind comprising a rigidly-mounted heavy track along which the display unit 2 and camera 3 can be slid.

The display unit 2 is of conventional form such as, for example, described in Dowell U.S. Pat. No. 4,001,499 issued Jan. 4, 1977, for "Display Systems", and assigned to the assignee of the instant application. The unit 2 comprises a cathode-ray tube 20 having a display area or screen 21 on which flight, weapon-control or other information 200 is displayed by raster scanning or cursive means. The image on the screen 21 is projected on a semi-transparent reflector or combiner 22 which is inclined to the normal line-of-sight (represented by the line 23) of a pilot so that he would see the display image in the combiner 22 against a background of the external scene through an aircraft windscreen. The combiner 22 could alternatively be provided by a diffractive element such as, for example, a diffractive holographic element. The display is projected from the display screen 21 of the cathode-ray tube 20 by an optical system 24 that includes a horizontal converging lens 25 and that serves to focus the image seen by the pilot, substantially at infinity. The unit 2 also includes an associated electronics unit 26 for controlling generation of the image on the screen 21. Before installation in an aircraft, the electronics unit 26 is adjusted and calibrated to ensure correct functioning and, more particularly, to ensure the correct disposition and brightness of the image on the screen 21.

The head-up display unit 2 is mounted on the optical bench 1 by means of two electrically-operated rotary indexing tables, shown schematically as a horizontal table 27 and a vertical table 28. The horizontal table 27 is arranged to rotate the display unit 2 about a vertical axis 29 at right angles to the line-of-sight 23 (and to the length of the optical bench 1). The vertical table 28 is mounted on the horizontal table 27, so as thereby to be rotated with it, and is arranged to rotate the display unit 2 about a horizontal axis 30 at right angles to the line-of-sight 23. The two indexing tables 27 and 28 are arranged such that the display unit 2 is pivoted about the center of the optical aperture of the display unit, that is, where the line-of-sight 23 meets the combiner 22. Rotary displacement of the tables 27 and 28 is controlled by output signals from the processing unit 4 along lines 5 and 6 respectively.

The television camera 3 is of the CCD type, that is, it includes a charge-coupled device (CCD) 31 comprising a matrix array of light-sensitive elements 310. An image is focussed on the CCD 31 by a lens 32 and the CCD is scanned by a suitable circuit (not shown) contained within the camera 3. Signals representative of the intensity of light imaged on the individual elements 310 of the CCD 31 are supplied from the camera 3 along a line 7 to the processing unit 4. The lens 32 is focussed at infinity and has a long-focal length (telephoto) giving the camera 3 a field-of-view of 1.5 degrees so that a small area of the display image provided by the unit 2 can be examined. A CCD array might typically comprise a matrix of 488 elements along the vertical axis by 380 elements along the horizontal axis. A small spot generated by the head-up display unit 2 might typically be 0.6 milliradians, that is, 124 seconds and could be defined to within about 3.6 seconds horizontally and 2.2 seconds vertically by the camera 3 neglecting the effects of distortion by the lens 32. The lens distortion can be calibrated and suitable correction made by the processing unit 4. The image generated on the head-up display screen 21 could also be arranged to be central within the field-of-view of the camera 3 where the distortion of the lens 32 is a minimum.

The camera 3 is mounted on the optical bench 1 by a two-axis cross slide 33 so that the camera can be displaced laterally along two axes at right angles to the length of the optical bench 1.

To avoid errors that might otherwise arise because of distortion in the horizontal converging lens 25 and the combiner 22, it is necessary to view different parts of the screen 21 via the same part of the lens and the combiner. This could be achieved if the camera 3 was mounted for both rotational and lateral displacement. By mounting the display unit 2, rather than the camera 3, for rotation, however, it is possible to view different parts of the screen 21 through the same parts of the lens 25 and combiner 22 without the need to effect any lateral movement after the initial alignment, either of the display unit or the camera. Other problems might arise if the camera 3, instead, was mounted for rotation, such as, by means of two rotary indexing tables mounted on the two-axis cross slide 33. This is because, to achieve the necessary accuracy, the indexing tables are usually relatively heavy, typically about 113 kg. To prevent distortion of the cross slide 33 and the optical bench 1 they would also have to be correspondingly heavy, leading to an overall increase in the size and weight of the testing apparatus.

In operation, the processing unit 4 causes a display-generating unit 8 to supply signals to the display unit 2, such as to cause an image of predetermined configuration, size and brightness to be generated at a predetermined location and orientation on the screen 21 (and, hence, in the field-of-view of the display unit). The processing unit 4 also supplies signals along lines 5 and 6 to cause the head-up display unit 2 to be tilted about the axes 29 and 30 to a position in which the generated image should be within the field-of-view of the camera 3. The camera 3 then supplies signals along line 7 to the processing unit 4 representative of the disposition (that is, the location, orientation and size) and brightness of the image in the field-of-view of the camera.

These signals from the camera 3, and information as to the orientation of the display unit 2, enable the processing unit 4 to calculate the actual disposition of the image in the field-of-view of the display unit and also to calculate the difference between this actual disposition and the disposition signalled by the processing unit. The processing unit 4 then calculates the adjustments required to be made to the display unit 2 and supplies appropriate signals to an indicator panel 9 giving information concerning these adjustments.

Figure 4:
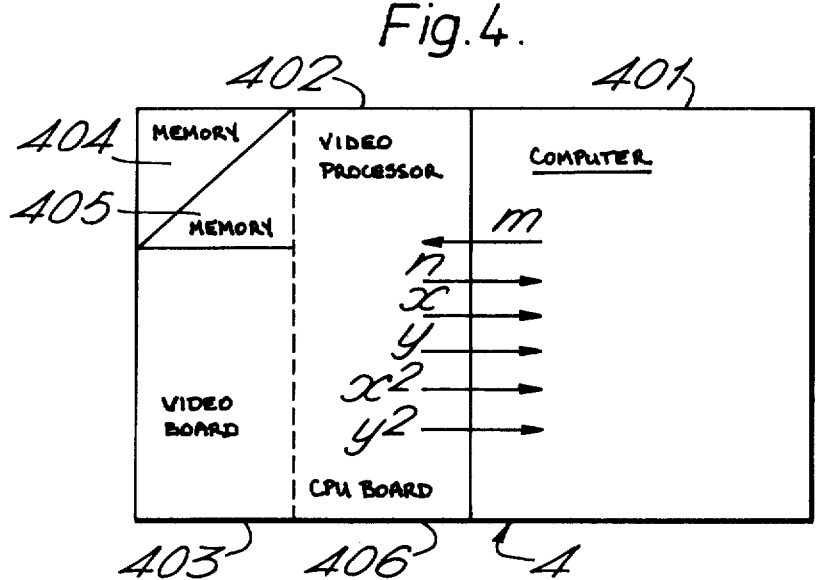
FIG. 4 illustrates schematically a part of the display system.

With reference to FIG. 4, the processing unit 4 comprises a conventional desk-top computer 401, and a video processor 402.

The computer 401 has the usual VDU, random access memory, BASIC interpreter, floppy disc store and printer, and communicates with the rest of the system via a IEEE 488 data bus.

The video processor 402 is a microprocessor-controlled unit which accepts video signals from the camera 3 and controls signals from the data bus. The video processor 402 is itself divided into two units, namely a video board 403 having two memory units 404 and 405, and a CPU board 406. The video memories 404 and 405 are arranged such that the column address of the image corresponds to the high-order microprocessor address byte and the line address corresponds to the low-order address byte so that the picture column and row addresses correspond directly to the values in the H and L registers in the microprocessor. The video board 403 receives the input signals from the camera 3 and categorizes all the picture elements into black elements and white elements according to a threshold value determined by the computer 401—this enables an indication of the overall brightness of a scene to be determined. The black and white elements are then stored in the respective one or other of the video memories 404 and 405. The computer 401 then instructs the video processor 402 to set an area or window and to analyze the image within that window. The CPU board 406 interrogates the video memories 404 and 405 and analyzes the scene within the window, counting and categorizing according to size the objects seen within the window.

The computer 401 instructs the video processor 402 to supply the computer with data regarding the mth largest object. The video processor 402 supplies signals to the computer 401 regarding the size and disposition of this object in terms of the signals n (size of object), x (sum of x co-ordination of elements of object), y (sum of y co-ordination of elements of object), $x^2$ (sum of squares of x co-ordinates) and $y^2$ (sum of squares of y co-ordinates). From these data, the computer 401 calculates the size, center of area and orientation of the object being viewed.

The view processor 402 can store two complete TV pictures and can identify those parts of the two pictures which are common, or those parts which are different. This has application in the separation of moving objects from the background. A mechanism for detecting the edge of an object is also included in the video processing 402.

The apparatus could alternatively function in a feedback or servo manner. In this manner, an image is generated in a fixed position on the screen 21 of the display unit 2 and the orientation of the display unit is changed in response to signals from the television camera 3 (via the processing unit 4) until the image appears at a predetermined position—such as the center—of the field-of-view of the camera 3. Signals representative of the orientation of the display unit 2 are then indicative of the location of the image.

Figure 2:
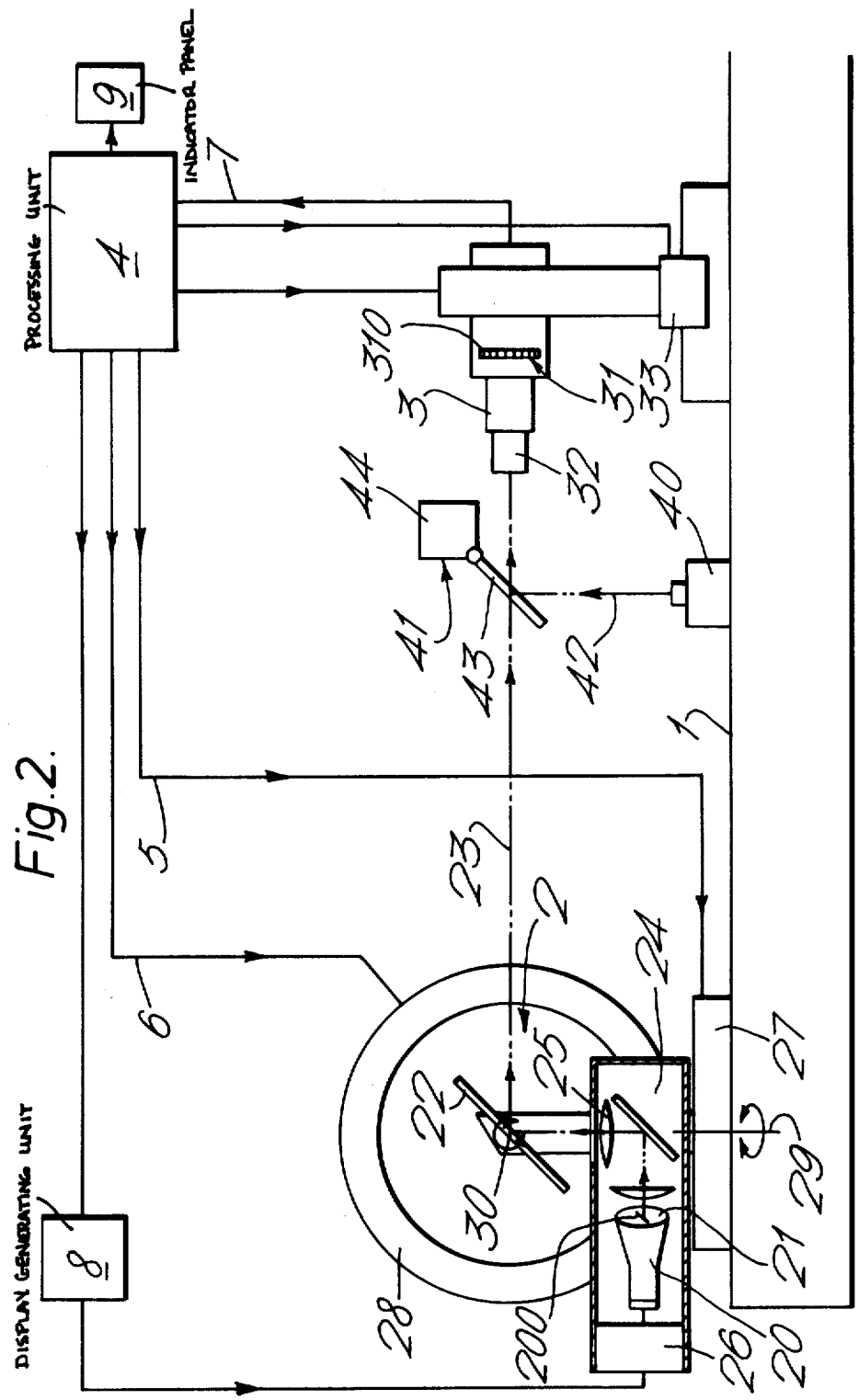
FIG. 2 shows a modification of the arrangement of FIG. 1.

With reference now to FIG. 2 there is shown a modification whereby the brightness of an image on the display unit 2 can be accurately determined. The apparatus shown in FIG. 2 includes, in addition to the apparatus of FIG. 1, a light source 40 and a mirror assembly 41. The light source 40 is mounted on the optical bench 1 and produces a narrow collimated beam of light 42 of substantially the same wavelength as that produced by the display unit 2. The light source 40 is switchable between two brightness levels, one high and the other low. The beam of light 42 is directed upwards to a reflector 43 of the mirror assembly 41. The reflector 43 is pivoted so that it can be swung into and out of the line-of-sight 23 under control of an actuator 44.

When the reflector 43 is swung down into the line-of-sight 23, the beam of light 42 from the source 40 is reflected to the camera 3 but the light from the display unit 2 is totally obscured. In operation, to determine the brightness of a spot of light produced by the display unit 2, the reflector 43 is swung down so as to reflect light from the source 40 to one or more of the elements of the CCD 31. The light source 40 is switched between its two brightness levels and the response of the elements of the CCD 31 to these two known brightness levels is measured by the processing unit 4. The actuator 44 then lifts the reflector 43 out of the line-of-sight 23, and the spot of light produced by the display unit 2 is moved within the field-of-view so as to be aligned with that element, or those elements, of the CCD 31 previously illuminated by the calibrated light source 40. The response of the element of the CCD 31 to this spot of light is then determined and compared with its response to the two known brightness levels so that an indication of the brightness of the spot of light on the screen 21 can be obtained. The brightness of illumination caused by the light source 40 depends upon the reflectivity of the reflector 43 and account is taken of this reflectivity in calibration.

Figure 3:
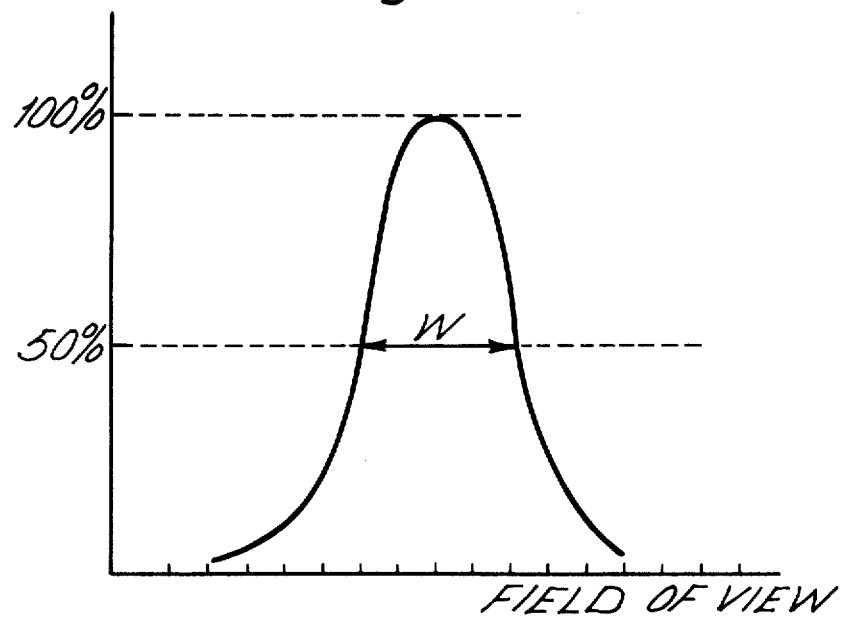
FIG. 3 illustrates the intensity distribution across the width of an image on the display system.

The intensity distribution of an image on the display unit 2 across the field-of-view of the camera 3 will not in general be sharply defined but will have a form such as that shown in FIG. 3. An indication of the width of the image is, in general, obtained by determining the width at some predetermined proportion of maximum intensity, such as, for example, the width W at 50% of maximum intensity. Inaccuracies would, however, arise if the width of the image was simply measured by determining which elements of the CCD 31 are illuminated at 50% of the maximum image intensity and then determining the separation of those elements, since the brightness response of each element of the CCD varies one from the other. The width of an image is instead preferably determined by causing the image to be displaced across an individual element 310 of the CCD 31 and then determining the displacement that occurred between the two positions where that element was illuminated with the predetermined proportion of maximum intensity. The displacement of the image may be caused by either displacing the image 200 on the screen 21 or by rotating the entire display unit 2.

To reduce the effects of lens distortion the lens aperture may be reduced but with a consequent reduction in the intensity of light falling on the CCD 31. At low light intensities the dark current of the CCD 31 (that is, the small currents which flow in the absence of incident radiation) may become important. The effect of the dark currents can be reduced if the CCD 31 is cooled, such as, for example, with a liquid or vapour coolant, or by use of a Peltier-effect junction, or other solid-state cooling device.

It will be appreciated that the invention is not restricted to the testing of display systems including cathode-ray tube displays. The display could instead include some other form of display such as, for example, a matrix array of light-emitting elements. The invention is, furthermore, not restricted to use with head-up display systems but could instead be used, for example, with conventional cathode-ray tube displays or with pointer instruments.

I claim:

1. In apparatus for determining the disposition of a display representation in a display area of a display system of the kind including means supplying signals to affect the disposition of said display representation, the improvement wherein the apparatus includes a camera of the kind including an array of radiation-responsive elements, mounting means mounting said camera to view said display area, the camera deriving an indication of the disposition of said display representation, processing means comparing the disposition of said display representation as derived from said camera with said signals supplied to said display system thereby to derive an indication of the difference between the signalled disposition and the actual disposition of said display representation, a source of known brightness, and means for imaging radiation from said source onto said array, said processing means comparing the output from an individual one of said elements when illuminated by radiation from said display area with the output when illuminated by radiation from said source.

2. Apparatus according to claim 1, wherein said display area is the screen of a cathode-ray tube.

3. Apparatus according to claim 1, wherein said display system provides an image of said display representation substantially at infinity.

4. Apparatus according to claim 3, wherein said display system is a head-up display system for a vehicle.

5. Apparatus according to claim 3, wherein said apparatus includes second mounting means supporting said display system for angular displacement about an axis at right angles to a line-of-sight between said camera and said display system.

6. Apparatus according to claim 5, wherein said second mounting means supports said display system for angular displacement about two axes at right angles to said line-of-sight.

7. Apparatus for determining the disposition of a display representation provided by a head-up display system, including: means supplying signals to affect the disposition of said display representation; a camera of the kind including an array of radiation-responsive elements; first mounting means mounting said camera to view said display representation along a line-of-sight between said camera and said display system; second mounting means supporting said display system for angular displacement about two axes at right angles to said line-of-sight; processing means comparing the disposition of said display representation as derived from said camera with said signals supplied to said display system thereby deriving an indication of the difference between the signalled disposition and the actual disposition of said display representation, and means connecting said processing means with said second mounting means, said processing means being operable to control angular displacement of said display system about said two axes.

8. A method of determining the disposition of a display representation in a display area of a display system including the steps of: supplying signals to said system to affect disposition of said display representation, viewing said display area with a camera of the kind including an array of radiation-responsive elements, deriving an indication of the disposition of the display representation from the camera, comparing the disposition of the display representation as derived by said camera with the signals supplied to the display system thereby to derive an indication of the difference between the signalled disposition and the actual disposition of the display representation, and providing an indication of the brightness of said display representation by illuminating an individual element of said array first by a part of said display representation and then by a source of known brightness and comparing the output of the element when illuminated by said display representation and said source.

9. A method of determining the disposition of a display representation in a display area of a head-up display system including the steps of: mounting said display system for angular displacement about two axes, viewing said display area along a line-of-sight at right angles to said axes, with a camera of the kind including an array of radiation-responsive elements, supplying signals to effect angular displacement of said display system and thereby to affect the disposition of said display representation relative to said line-of-sight, deriving from the camera an indication of the disposition of the display representation relative to said line-of-sight, and calculating the disposition of the display representation relative to the field-of-view of the display system from the signals supplied to effect angular displacement of the display system and from said indication of the disposition of the display representation relative to the said line-of-sight.

* * * * *